(12) United States Patent
Klein et al.

(10) Patent No.: US 9,827,610 B2
(45) Date of Patent: Nov. 28, 2017

(54) METHOD FOR PRODUCING A ROTOR VANE FOR A TURBOMACHINE

(71) Applicant: SNECMA, Paris (FR)

(72) Inventors: Guillaume Klein, Mery sur Oise (FR); Josserand Bassery, Courbevoie (FR); Sebastien Congratel, La Brosse MontCeaux (FR); Raphael Dupeyre, Asnieres sur Seine (FR); David Mathieu, Chelles (FR); Ba-Phuc Tang, Cergy Saint Christophe (FR)

(73) Assignee: SNECMA, Paris (FR)

( * ) Notice: Subject to any disclaimer, the term of this patent is extended or adjusted under 35 U.S.C. 154(b) by 223 days.

(21) Appl. No.: 14/771,785

(22) PCT Filed: Mar. 4, 2014

(86) PCT No.: PCT/FR2014/050471
§ 371 (c)(1),
(2) Date: Aug. 31, 2015

(87) PCT Pub. No.: WO2014/135782
PCT Pub. Date: Sep. 12, 2014

(65) Prior Publication Data
US 2016/0016227 A1    Jan. 21, 2016

(30) Foreign Application Priority Data

Mar. 7, 2013 (FR) ...................................... 13 52073

(51) Int. Cl.
*B22D 25/02* (2006.01)
*B22C 9/22* (2006.01)
*F01D 5/22* (2006.01)
*F01D 9/02* (2006.01)
*F01D 11/08* (2006.01)
*B23P 15/02* (2006.01)

(52) U.S. Cl.
CPC ................ *B22D 25/02* (2013.01); *B22C 9/22* (2013.01); *F01D 5/225* (2013.01); *F01D 9/02* (2013.01); *F01D 11/08* (2013.01); *B23P 15/02* (2013.01); *F05D 2240/12* (2013.01); *F05D 2240/55* (2013.01)

(58) Field of Classification Search
CPC ... B29C 9/22; F01D 5/225; F01D 9/02; F01D 11/08; B22D 25/02
See application file for complete search history.

(56) References Cited

FOREIGN PATENT DOCUMENTS

| EP | 1734227 | 12/2006 |
| FR | 2977909 | 1/2013 |

OTHER PUBLICATIONS

International Search Report, dated Jul. 8, 2014, Application No. PCT/FR2014/050471.

*Primary Examiner* — John Uselding
(74) *Attorney, Agent, or Firm* — Blakely Sokoloff Taylor & Zafman LLP

(57) ABSTRACT

A method for producing a rotor vane (10) for a turbomachine, including producing a rough casting, the heel of which has a downstream lip (121) with a transverse increased thickness (130) such that the lip has an upstream surface (134) substantially parallel to an axis The method further includes machining said increased thickness so that the downstream lip has an upstream surface (138) inclined in relation to the axis.

11 Claims, 3 Drawing Sheets

METHOD FOR PRODUCING A ROTOR VANE FOR A TURBOMACHINE

TECHNICAL FIELD

The present invention relates to a method for producing a rotor blade for a turbine engine, and in particular a rotor blade of a low-pressure turbine.

PRIOR ART

The prior art includes namely EP-A1-1 734 227 and FR-A1-2 977 909.

A rotor blade of a low-pressure turbine comprises a vane of which one end is connected to a root by a platform and of which the opposite end is connected to a heel bearing knife-edge seals. The roots of the blades are engaged in grooves having a complementary shape, for example having a dovetail cross section, which are formed on the periphery of a disc of the turbine. The disc has an annular array of blades, the platforms of which internally delimit the stream of flow of the gases in the turbine, and the heels externally delimit said stream.

The knife-edge seals of the heels extend radially outwards, relative to the longitudinal axis of the disc, and are intended to interact frictionally with a ring made of abradable material which surrounds the disc and which is supported by a casing of the turbine, to limit the leaks of gas out of the stream, that is to say leaks between the heels of the blades and the casing.

In the current art, the knife-edge seals of a blade are said to be straight, that is to say that they are substantially parallel to the longitudinal axis of the blade.

Said knife-edge seals are produced by casting using a mould which comprises cavities for producing the knife-edge seals. After the solidification of the knife-edge seals, the mould is removed by moving it radially towards the outside in a direction which is substantially parallel to the longitudinal axis of the blade.

It has already been proposed to use a blade having knife-edge seals which are inclined relative to the longitudinal axis of the blade. Said inclined knife-edge seals are more effective because they provide better sealing, limiting the leaks of gas out of the stream.

In the case where said inclined knife-edge seals are produced by casting, the mould should be removed by moving it radially towards the outside in a direction which is substantially parallel to the plane of inclination of the knife-edge seals.

However, in practice, this solution is not feasible. The heel of the blade is formed by casting with a web of material which connects the two knife-edge seals and which is to be removed by subsequent machining. This web of material is an extension of the vane of the blade beyond the heel thereof and is indispensable for the blades produced from anisotropic materials of the DS200 type (nickel-based alloys), so as to ensure correct orientation of the grains during formation in the vane in the casting step. The design of this web of material requires the casting mould to be moved in translation in parallel with the longitudinal axis of the blade in order to be able to remove it, otherwise demoulding is not possible.

Therefore it is not possible in the current art to produce by casting knife-edge seals of a rotor blade which are inclined and connected by a web of material of the above-mentioned type.

The aim of the invention is in particular to provide a simple, effective and economical solution to this problem.

SUMMARY OF THE INVENTION

The invention proposes a method for producing a rotor blade for a turbine engine, said blade comprising a vane which is connected at one end to a root and at the opposite end thereof to a heel bearing upstream and downstream knife-edge seals, which are inclined at least in part relative to the longitudinal axis of the blade, the method comprising a step which consists in producing a blank casting which is to be machined, characterised in that the downstream knife-edge seal is formed by casting having a transverse machining allowance in such a way that said knife-edge seal has an upstream face which is substantially parallel to the above-mentioned axis, and in that the method comprises an additional step which consists in machining said machining allowance so that the downstream knife-edge seal has an upstream face which is inclined relative to the above-mentioned axis.

The above-mentioned disadvantages of the prior art are eliminated by means of the "straight" upstream face of the downstream knife-edge seal, which allows the mould to be removed by translation along the longitudinal axis of the blade. The upstream knife-edge seal of the blade already has an inclined orientation, and the upstream portion of the downstream knife-edge seal must be machined so as to likewise give it an inclined orientation.

The invention makes it possible to keep simple casting tools for the production of the blade, and thus to reduce the cost thereof. It also makes it possible to obtain the knife-edge seals in a single demoulding step, and this simplifies the production method. Moreover, the excess mass added to the blank casting as a result of the machining allowance is relatively low. The mass of the finished blade is practically unchanged due to the fact that the entirety of said machining allowance is to be removed by machining.

Advantageously, the knife-edge seals are produced by casting using a mould which, after solidification of the knife-edge seals, is removed from the blade by moving it in translation towards the outside in a direction which is substantially parallel to the longitudinal axis of the blade.

The machining can be carried out using a grinding wheel or any other suitable technique.

The knife-edge seals can have different angles of inclination relative to the above-mentioned axis.

Said upstream face preferably extends over substantially the entire axial dimension (along the longitudinal axis of the blade) of the downstream knife-edge seal.

The blank casting is preferably made of an anisotropic material, in particular a nickel-based material.

The present invention also relates to a mould for carrying out casting of the upstream and downstream knife-edge seals of the heel of a turbine engine rotor blade, comprising a first cavity for forming the upstream knife-edge seal and a second cavity for forming the downstream knife-edge seal, the cavities opening onto a substantially planar face of the mould which is intended to define an outer face of the heel of the blade, characterised in that the first cavity comprises a downstream face which is inclined relative to a normal to said planar face, and the second cavity comprises an upstream face which is substantially parallel to said normal.

The invention also relates to a blank casting which is to be machined to produce a turbine engine rotor blade, comprising a vane which is connected at one end to a root and at the opposite end thereof to a heel bearing upstream and downstream knife-edge seals, the upstream knife-edge seal being inclined at least in part relative to the longitudinal axis of the blade, characterised in that the downstream knife-edge seal comprises an upstream face which is substantially parallel to the above-mentioned axis and a downstream face which is inclined relative to said axis.

In a particular embodiment, the upstream knife-edge seal is inclined by an angle of approximately 30° relative to the above-mentioned axis, and the downstream face of the downstream knife-edge seal is inclined by an angle of approximately 15° relative to said axis.

The knife-edge seals of the blank casting can be interconnected by a material web.

DESCRIPTION OF THE DRAWINGS

The invention will be better understood, and other details, features and advantages of the invention will become apparent upon reading the following description, given by way of non-limiting example with reference to the accompanying drawings, in which.

DETAILED DESCRIPTION

Figure 1:
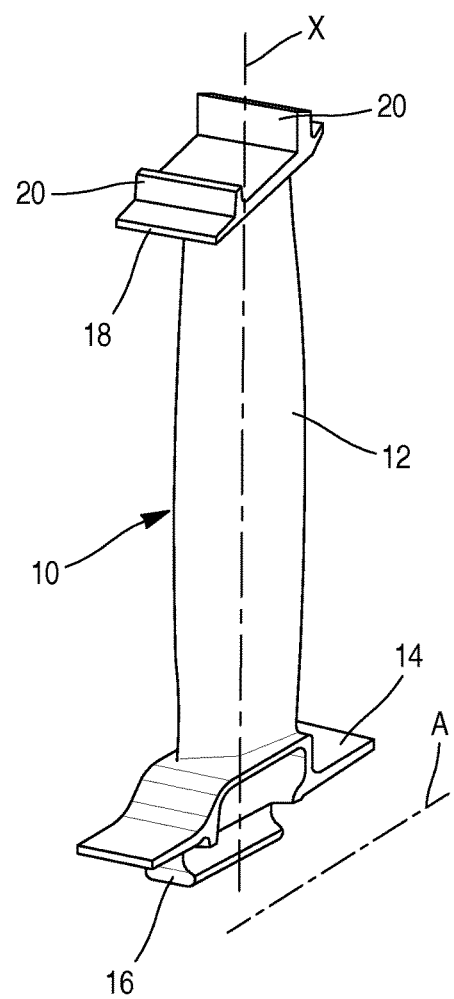
FIG. 1 is a schematic perspective view of a rotor blade of a low-pressure turbine of a turbine engine.

Reference is made firstly to FIG. 1 which shows a rotor blade 10 of a low-pressure turbine of a turbine engine, said blade comprising a vane 12 which is connected at one end by a platform 14 to a root 16, having a dovetail cross section in this case, and at the opposite end thereof to a heel 18 bearing knife-edge seals 20 extending radially towards the outside (relative to the longitudinal axis A of the turbine).

Figure 2:
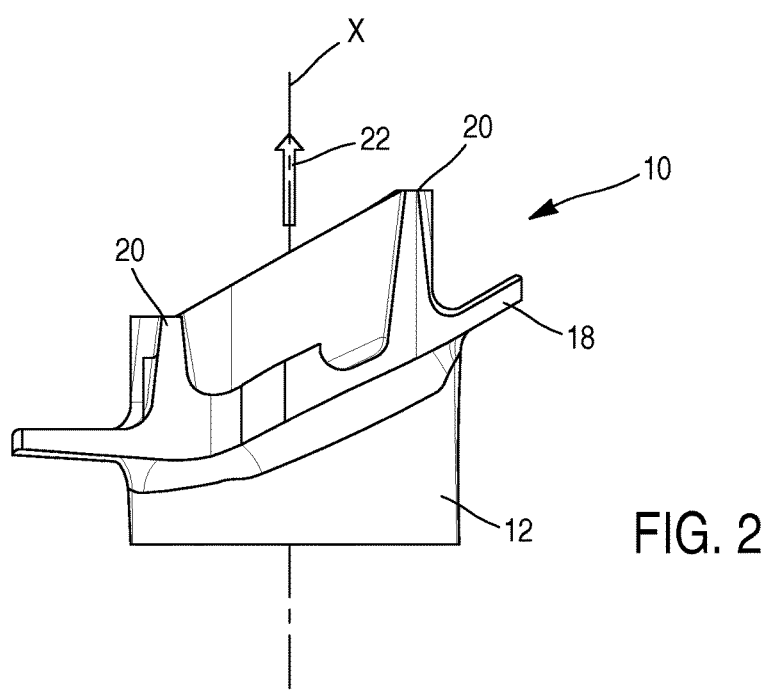
FIG. 2 is a schematic perspective view on a larger scale of the heel of the blade from FIG. 1, said heel bearing straight knife-edge seals.
Figure 3:
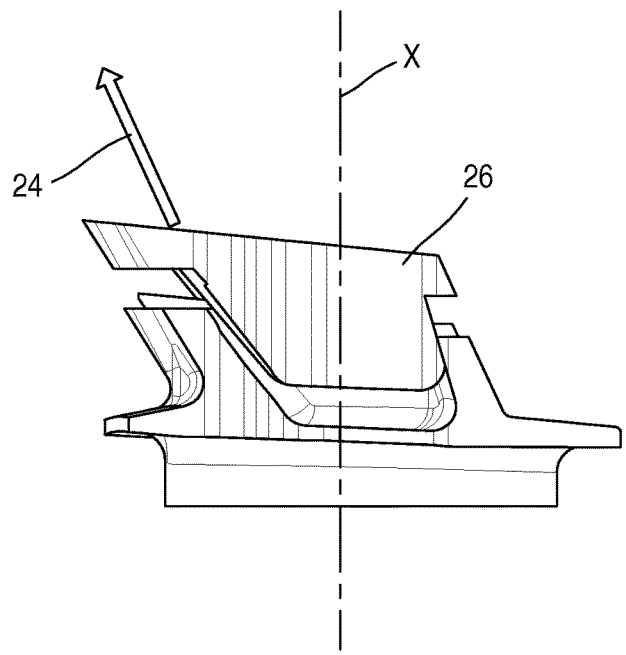
FIG. 3 is a schematic perspective view of the heel of a rotor blade and of a mould for casting the inclined knife-edge seals of said heel.

FIG. 2 shows a heel 18 of which the knife-edge seals are straight, that is to say that they extend in parallel with the longitudinal axis X of the blade, and FIG. 3 shows a heel having knife-edge seals which are inclined relative to said axis X.

The blade 10 is produced by casting, for example by a lost wax technique. The casting process makes it possible to obtain a blank casting which is to be machined for the final grading of the different portions of the blade. This process is implemented using in particular a mould comprising cavities for producing the knife-edge seals.

In the case where the knife-edge seals are straight (FIG. 2), the mould is removed by moving it in translation towards the outside in parallel with the axis X (arrow 22). In the case where the knife-edge seals are inclined (FIG. 3), the mould 26 should be removed by moving it in translation towards the outside in a direction which is parallel to the plane of inclination of the knife-edge seals (arrow 24).

However, the latter operation is not feasible in practice, in particular because, in the blank casting, the knife-edge seals are interconnected by a material web which requires the above-mentioned mould to be removed in a direction in parallel with the axis X.

The invention makes it possible to remedy this problem due to the downstream knife-edge seal being produced having a transverse machining allowance (or axial machining allowance along the above-mentioned axis A) which is intended to facilitate the removal of the mould in the preferred direction (along the axis X) and to be subsequently machined.

Figure 4:
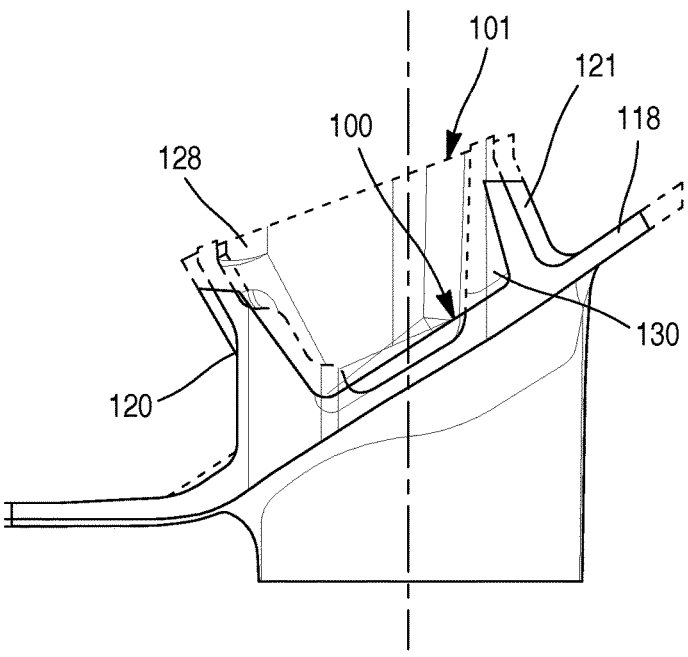
FIG. 4 is a schematic perspective view of another blade heel bearing inclined knife-edge seals.

FIG. 4 shows the heel 118 of a rotor blade 100 (in continuous lines) obtained by the method according to the invention, and the corresponding portion of the blank casting 101 (in dotted lines).

The blank casting 101 is intended to be machined, for example by grinding. In the embodiment shown, the machined portions of the blank casting are: the upstream and downstream ends of the heel 118, the radially outer ends of the knife-edge seals 120, 121, the above-mentioned material web 128, and the above-mentioned machining allowance 130 which is provided on the downstream knife-edge seal. In a particular embodiment of the invention, the downstream knife-edge seal 121 has a thickness of approximately 1 mm at the radially outer end thereof and of approximately 3.7 mm at the radially inner end thereof, the machining allowance being approximately 1-2 mm.

Figure 5:
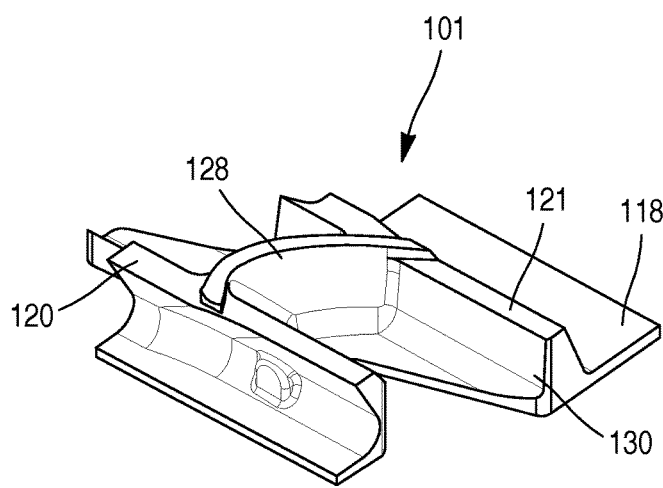
FIG. 5 is a schematic perspective view of the heel of a blank casting.
Figure 6:
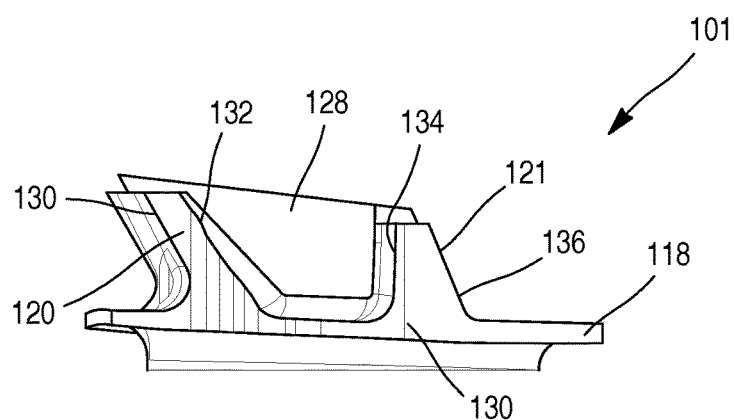
FIG. 6 is another schematic perspective view of the heel from FIG. 5.
Figure 7:
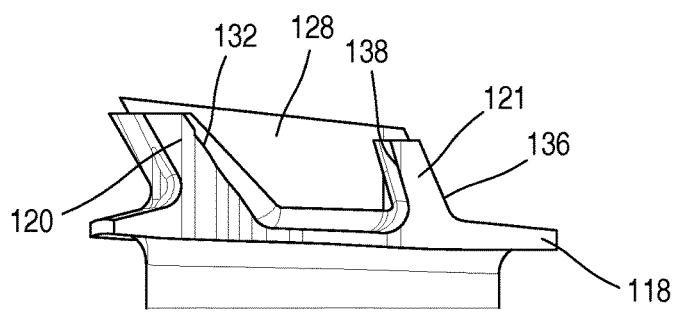
FIG. 7 is another schematic perspective view of the heel from FIG. 5, after machining the downstream knife-edge seal of the heel from FIG. 5.

FIGS. 5 and 6 show the heel 118 of a blank casting 101 according to the invention, and FIG. 7 shows said heel 118 after machining the downstream knife-edge seal 121.

The upstream knife-edge seal 120 is oriented from downstream to upstream towards the outside and facing upstream. Said seal comprises an upstream face 130 and a downstream face 132 which are inclined for example by approximately 30° relative to the longitudinal axis X of the blade.

The downstream blade 121 of the blank casting 101 comprises an upstream face 134 (located opposite the upstream knife-edge seal 120) which is substantially in parallel with the axis X and a downstream face 136 which is inclined relative to said axis X and oriented from downstream to upstream towards the outside and facing upstream. The upstream face extends over substantially the entire radial dimension (relative to the axis A—or axial dimension relative to the axis X) of the knife-edge seal 121 and is connected at the radially outer end thereof to the outer radial edge of the knife-edge seal and at the radially inner end thereof to the radially outer face of the heel 118.

The machining of the downstream knife-edge seal 121 and in particular of the upstream end portion thereof makes it possible to form an upstream face 138 on said seal which is inclined relative to the axis X, for example of approximately 15°. FIG. 4 shows the amount of material removed by machining. It is noted that the majority of this amount is removed in the region of the base or radially inner end of the downstream knife-edge seal 121.

Figure 8:
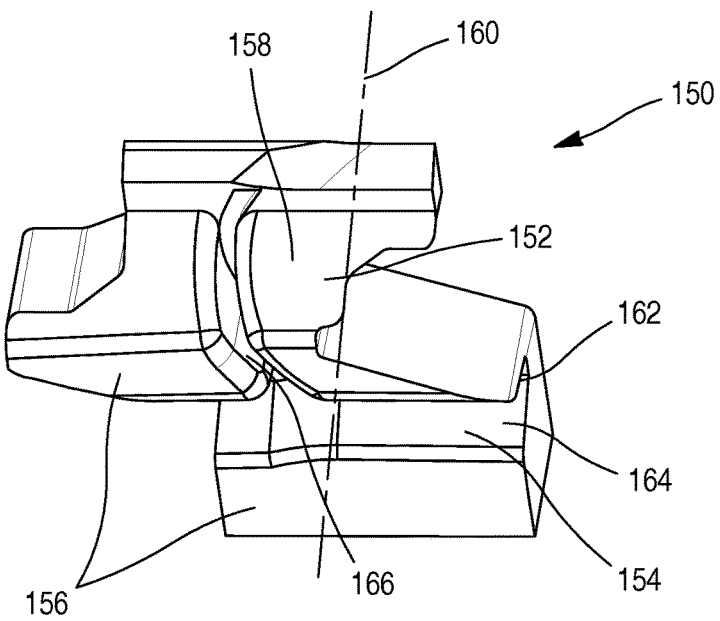
FIG. 8 is a schematic perspective view of a mould for casting the knife-edge seals.

FIG. 8 shows a mould 150 for producing the knife-edge seals 120, 121 of the heel 118, said mould comprising cavities 152, 154 for forming the knife-edge seals which open onto a planar face 156 which is intended to define the outer face of the heel 118. The cavity 152 for forming the upstream knife-edge seal 120 comprises a face 158 which is inclined relative to a normal 160 to the planar face and is intended to define the downstream face 132 of the upstream knife-edge seal 120. The cavity 154 for forming the downstream knife-edge seal 121 comprises, on the side of the cavity 152, a face 162 which is parallel to the normal 160, and, on the opposite side, a face 164 which is inclined relative to said normal. The mould 150 further comprises a groove 166 opening onto the planar face 156 and connecting the two cavities 152, 154, said groove being intended to receive material for forming the above-mentioned material web.

The invention claimed is:

1. A method for producing a rotor blade-for a turbine engine, said blade comprising a vane which is connected at one end to a root and at the opposite end thereof to a heel bearing upstream and downstream knife-edge seals, which are inclined at least in part relative to the longitudinal axis (X) of the blade, the method comprising a step which consists in producing a blank casting which is to be machined, wherein the downstream knife-edge seal is formed by casting having a transverse machining allowance in such a way that said knife-edge seal has an upstream face which is substantially parallel to the above-mentioned axis, and in that the method comprises an additional step which consists in machining said machining allowance so that the downstream knife-edge seal has an upstream face which is inclined relative to the above-mentioned axis.

2. The method according to claim 1, wherein the knife-edge seals are produced by casting using a mould which, after solidification of the knife-edge seals, is removed from the blade by moving it in translation towards the outside in a direction which is substantially parallel to the longitudinal axis (X) of the blade.

3. The method according to claim 1, wherein the machining is carried out using a grinding wheel.

4. The method according to claim 1, wherein the knife-edge seals have different angles of inclination relative to the above-mentioned axis.

5. The method according to claim 1, wherein said upstream face extends over substantially the entire axial dimension of the downstream knife-edge seal.

6. The method according to claim 1, wherein the blank casting is made of an anisotropic material.

7. A mould for carrying out casting of the upstream and downstream knife-edge seals of the heel of a turbine engine rotor blade, comprising a first cavity for forming the upstream knife-edge seal and a second cavity for forming the downstream knife-edge seal, the cavities opening onto a substantially planar face of the mould which is intended to define an outer face of the heel of the blade, wherein the first cavity comprises a downstream face which is inclined relative to a normal to said planar face, and the second cavity comprises an upstream face which is substantially parallel to said normal.

8. A blank casting which is to be machined to produce a turbine engine rotor blade, comprising a vane which is connected at one end to a root and at the opposite end thereof to a heel bearing upstream and downstream knife-edge seals, the upstream knife-edge seal being inclined at least in part relative to the longitudinal axis of the blade, wherein the downstream knife-edge seal comprises an upstream face which is substantially parallel to the above-mentioned axis and a downstream face which is inclined relative to said axis.

9. The blank casting according to claim 8, wherein the upstream knife-edge seal is inclined by an angle of approximately 30° relative to the above-mentioned axis, and the downstream face of the downstream knife-edge seal is inclined by an angle of approximately 15° relative to said axis.

10. The blank casting according to claim 8, wherein said knife-edge seals are interconnected by a material web.

11. The method according to claim 1, wherein the anisotropic material is a nickel-based material.

* * * * *